United States Patent
Nelson

(10) Patent No.: US 9,650,559 B2
(45) Date of Patent: May 16, 2017

(54) CEMENT ISOLATION FLUIDS FOR WELLBORES, METHODS OF MAKING, AND METHODS OF USE

(71) Applicant: Scott Gregory Nelson, Cypress, TX (US)

(72) Inventor: Scott Gregory Nelson, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 49 days.

(21) Appl. No.: 14/643,138

(22) Filed: Mar. 10, 2015

(65) Prior Publication Data

US 2016/0265306 A1    Sep. 15, 2016

(51) Int. Cl.

| E21B 33/138 | (2006.01) |
|---|---|
| C09K 8/40 | (2006.01) |
| E21B 33/13 | (2006.01) |
| E21B 21/00 | (2006.01) |

(52) U.S. Cl.
CPC .............. *C09K 8/40* (2013.01); *E21B 21/00* (2013.01); *E21B 33/13* (2013.01)

(58) Field of Classification Search
CPC ..... C04B 28/02; E21B 33/138; E21B 21/003; E21B 21/08; E21B 21/00; E21B 33/13; C09K 8/42; C09K 8/24; C09K 8/32
See application file for complete search history.

(56) References Cited

U.S. PATENT DOCUMENTS

| 3,820,602 A | 6/1974 | Motley et al. |
|---|---|---|
| 3,850,248 A | 11/1974 | Carney |
| 5,866,517 A | 2/1999 | Carpenter et al. |
| 6,059,034 A | 5/2000 | Rickards et al. |
| 6,330,916 B1 | 12/2001 | Rickards et al. |
| 6,364,018 B1 | 4/2002 | Brannon et al. |
| 7,426,961 B2 | 9/2008 | Stephenson et al. |
| 2006/0213662 A1* | 9/2006 | Creel ............... E21B 27/02 166/286 |
| 2010/0204069 A1 | 8/2010 | Le et al. |
| 2012/0305250 A1 | 12/2012 | Burts et al. |
| 2013/0341025 A1 | 12/2013 | Gupta |
| 2014/0332213 A1 | 11/2014 | Zhou et al. |
| 2016/0264838 A1 | 9/2016 | Nelson |

OTHER PUBLICATIONS

Bishop, et al., "A Robust, Field Friendly, Cement Spacer System" Drilling Specialties Company, ConocoPhillips Company; AADE Fluids Conference and Exhibition held in Houston, TX, Apr. 8-9, 2008; 5 pages.

Hannah, R.R. et al., "The Real-Time Calculation of Accurate Bottomhole Fracturing Pressure From Surface Measurements Using Measured Pressures as a Base", SPE 12062 (1983); 12 pages.

Jacot, et al., "Technology Integration—A Methodology to Enhance Production and Maximize Economics in Horizontal Marcellus Shale Wells", SPE 135262 (2010); 28 pages.

Yeager et al., "Injection/Fall-off Testing in the Marcellus Shale: Using Reservoir Knowledge to Improve Operational Efficiency", SPE 139067 (2010); 19 pages.

\* cited by examiner

*Primary Examiner* — Zakiya W Bates
(74) *Attorney, Agent, or Firm* — Cantor Colburn LLP

(57) ABSTRACT

A cement isolation fluid for use in a wellbore during a cementing operation includes an aqueous carrier fluid and a preformed synthetic polymer swellable in the carrier fluid, in an amount effective to isolate a cement slurry from another drilling fluid present in the wellbore. A method of cementing a wellbore comprising a drilling fluid includes injecting the cement isolation fluid into the wellbore; injecting a cement slurry into the wellbore; and hardening the cement in the slurry to cement the wellbore.

22 Claims, No Drawings

CEMENT ISOLATION FLUIDS FOR WELLBORES, METHODS OF MAKING, AND METHODS OF USE

BACKGROUND

This disclosure relates to cement isolation fluids for use in wellbores, methods for their manufacture, and methods of use comprising at least one of the foregoing.

Drilling fluids (or "muds") used in the drilling of subterranean oil and gas wells and other drilling applications are well known. Drilling fluids carry cuttings and other particulates from beneath the bit, transport them through the annulus, and allow their separation at the surface while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores, and electrical logs. It will be appreciated that as used herein, the term "drilling fluid" also encompasses "drill-in fluids" and "completion fluids".

Plugging oil or gas wells with a cement plug is a common operation in the art. In general, one of the goals of plug cementing is to secure a stable and effective seal in a designated location of the wellbore, generally not at the bottom of the wellbore. In another operation, a cement plug known as a whipstock plug is intended to set up within the well at a desired location. After the cement has hardened, the drilling operation commences with the intent of using the whipstock plug cement as a kickoff point from which to redirect the path of the drill bit and therefore the direction of the wellbore. The cement is accordingly placed in the desired location in the well in the form of a slurry, which then sets to form the cement plug. Placing a relatively small amount of cement slurry above a larger volume of drilling fluid requires consideration of design factors such as the density and rheology of both the cement and the drilling fluid, hole size and hole angle, including vertical, deviated and horizontal well orientations.

Cement spacers and scavenger cement systems are used to aid separating drilling fluid from the cement slurry. Because cement slurries are usually denser than drilling fluids, the lighter drilling fluid tends to migrate upward and through the cement slurry. At the same time, the heavier cement slurry tends to fall in the wellbore as it sets up. This phenomenon is known as density swapping of fluids within the wellbore. Density swapping can ultimately lead to the plug failing to set in its intended place, and the subsequent mixing of wellbore fluids with the plug slurry will have detrimental effects on the intended performance of the set cement. It is common in the case of whipstock plugs that multiple cement plugs are placed within the wellbore before a successful attempt is accomplished. Due to the inefficiency of the plug cementing operation, delays of many hours or days in the drilling and completion of a well can result.

Known cement spacers can have drawbacks such as instability under operating conditions, especially at higher temperatures as they can exist at the bottom of the wellbore. Other prior art cement spacer fluids are not entirely effective, and allow mixing and remixing of the fluids they are designed to separate. Even if the mixing does not result in density swapping, contamination of the cement slurry can slow or prevent setting, such that the set cement may be compromised with respect to its ability to bond to both the exposed rock surface in the drilled wellbore and to the tubulars placed in the wellbore. In another type of operation, a plug may be placed within the casing string and, if compromised with respect to its integrity, it may not remain competent within the well to perform its purpose.

Accordingly, there remains a need in the art for a wellbore fluid that overcomes the aforementioned drawbacks of using cement spacers to isolate cement slurries. It would be a particular advantage if the fluids were stable at high temperatures.

BRIEF DESCRIPTION

A cement isolation fluid for use in a wellbore includes an aqueous carrier fluid; and a preformed synthetic polymer swellable in the carrier fluid in an amount effective to isolate a cement slurry from another drilling fluid present in the wellbore during a cementing operation.

A method of cementing a wellbore comprising a drilling fluid includes injecting the cement isolation fluid described herein into the wellbore; injecting a cement slurry into the wellbore; and hardening the cement in the slurry to cement the wellbore.

DETAILED DESCRIPTION

A detailed description of one or more embodiments is presented herein by way of exemplification and not limitation.

An improved method for cementing a well uses a cement isolation fluid comprising a water-swellable, preformed synthetic polymer stable at high temperatures. The isolation fluid effective prevents density swapping of fluids within the wellbore. Without being bound by theory, it is believed that the preformed synthetic polymer utilizes a novel particle packing mode to create an isolating fluid that functions differently than current spacer systems. Absorption of water causes the preformed synthetic polymer to swell, and in some embodiments, agglomerate to a hydrated pack of swelled polymer. The swelled polymer more effectively prevents mixing of the fluids within the well with a cement slurry, and thus aids placement of the cement slurry and plug at the desired location. Additionally, the compositions herein reduce cement set-up times by preventing or minimizing the risk of catastrophic failure due to contamination of the cement plug. This capability is especially important in vertical wellbores. It has further been discovered by the inventor hereof that use of the preformed synthetic polymer in the cement spacer fluid provides improved stability of the isolation fluid. In a further advantageous feature, the fluids are stable, especially at the higher temperatures as they exist at the bottom of the wellbore. These features lead to enhanced segregation performance with respect to wellbore fluids, effecting an improvement in the placement of the cement plug at its intended place in the wellbore. As such, the compositions advantageously improve the overall quality of plug cementing operations in the wellbore.

The cement isolation fluid comprises a carrier fluid and the preformed synthetic polymer. The polymer can be present in the carrier fluid in any form, including particulate. In an embodiment, the polymer particles are swelled polymer particles. Swelling of the polymer particles can be the result of water absorption by the particles. The swelled polymer particles can agglomerate to a hydrated pack including swelled polymer particles. In an embodiment, the cement spacer fluid comprises a carrier fluid and a hydrated pack of swelled polymer particles comprising the preformed synthetic polymer.

The shape of the polymer particles before addition to the carrier fluid, or after swelling is not critical, and can be regular or irregular, for example spherical, ovoid, polyhedral, or fibrous, stranded, or braided. In an embodiment, the polymer particles are in the form of beads having an approximately spherical shape. The particles can further have pores or spaces between the polymer chains that admits entrance of a fluid or other particles therein. The shape, size, size distribution, and concentration of the polymer particles in the carrier fluid should be effective to provide efficient displacement of the drilling fluids, and are preferably selected to improve suspension of contaminant particulates in the cement spacer fluid. For example, unswelled particles can have an average largest diameter of about 150 to about 1,000 micrometers, preferably about 150 to about 800 micrometers. The unswelled polymer particles (e.g. dry particles) are in general swellable. Swelling leads to an increase in average largest diameter of the particles. This particle swellability can be about 1 to about 10 times, or about 1 to about 15 times, about 1.5 to about 10 times, based on average largest diameter of a swelled polymer particle relative to average largest diameter of the same particle without swelling. In a non-limiting example, a dry polymer particle having an average largest diameter of about 100 micrometer can swell to a swelled polymer particle with an average largest diameter of about 1,000 micrometers.

In some embodiments, at least about 60%, preferably at least about 80%, more preferably at least about 95% of the swelled polymer particles in the cement spacer fluid can have an average largest diameter of about 0.01 to about 100,000 micrometers, preferably about 0.1 to about 50,000 micrometers, or about 1 to about 10,000 micrometers more preferably about 100 to about 50,000 micrometers, about 500 to about 12,000 micrometers, or about 1,000 to about 8,000 micrometers. In other embodiments, at least about 95% of the polymer particles in the cement spacer fluid can have an average largest diameter of about 100 to about 15,000 micrometers, more preferably about 500 to about 12,000 micrometers. At least about 90% of the polymer particles can have an average largest diameter of about 1 to about 10,000 micrometers, preferably about 100 to about 15,000 micrometers, more preferably about 500 to about 10,000 micrometers. At least about 75% of the polymer particles can have an average largest diameter of about 100 to about 15,000 micrometers, preferably about 500 to about 12,000 micrometers, preferably about 1,000 to about 10,000 micrometers. At least about 50% of the polymer particles can have an average largest diameter of about 500 to about 12,000 micrometers, preferably about 1,000 to about 10,000 micrometers, preferably about 1,000 to about 8,000 micrometers. At least about 30% of the polymer particles can have an average largest diameter of about 1,000 to about 10,000 micrometers, preferably about 1,000 to about 8,000 micrometers, more preferably about 1,500 to about 7,000 micrometers.

The preformed synthetic polymer can be a superabsorbent polymer (SAP), which as used herein is a crosslinked, neutral, neutralized or partially neutralized polymer that is capable of absorbing large amounts of aqueous liquids, such as water, brine, acid, or base, with swelling and the formation of a gel or viscous material, and that retains the absorbed fluid under a certain pressure or temperature. The superabsorbent polymer can have internal crosslinks, surface crosslinks, or a combination comprising at least one of the foregoing. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

The SAP comprises a hydrophilic network that retains large amounts of aqueous liquid relative to the weight of the SAP (e.g., in a dry state, the SAP absorbs and retains a weight amount of water equal to or greater than its own weight). The SAPs can be a variety of synthetic organic polymers that react with or absorb water and swell when contacted with an aqueous fluid. Non-limiting examples of such SAPs are poly(hydroxy$C_{1-8}$ alkyl (meth)acrylate)s such as (2-hydroxyethyl acrylate), poly(meth)acrylamide, poly(vinyl pyrrolidine), poly(vinyl acetate), and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The preformed synthetic polymers are polymerized from nonionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkylaminoalkyl-substituted (meth)acrylamides, vinyl alcohol, vinyl acetate, allyl alcohol, $C_{1-8}$ alkyl (meth)acrylates, hydroxy$C_{1-8}$ alkyl (meth)acrylates such as hydroxyethyl (meth)acrylate, N-vinylformamide, N-vinylacetamide, and (meth)acrylonitrile. As used herein, "poly((meth)acrylamide)s" includes polymer comprising units derived from (meth)acrylamide, alkyl-substituted (meth)acrylamides such as N—$C_{1-8}$ alkyl (meth)acrylamides and N,N-di($C_{1-8}$ alkyl) (meth)acrylamides, aminoalkyl-substituted (meth)acrylamides such as N,N-di(amino($C_{1-8}$ alkyl))-substituted (meth)acrylamides, and (N,N-dialkylamino)alkyl-substituted (meth)acrylamides such as (N,N-di($C_{1-8}$ alkyl)amino)($C_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing can be used. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically-unsaturated anionic monomers having acidic groups, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, or a combination comprising at least one of the foregoing can be used.

Examples of cationic monomers include (N,N-di($C_{1-8}$alkylamino)($C_{1-8}$ alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di($C_{1-8}$alkyl)amino)$C_{1-8}$alkyl acrylamide, and the quaternary forms thereof such as acrylamidopropyl trimethyl ammonium chloride.

In an embodiment, the preformed synthetic polymer is amphoteric, containing both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

The preformed synthetic polymer can include a plurality of crosslinks among the polymer chains of the polymer. The crosslinks can be covalent and result from crosslinking the polymer chains using a crosslinker. The crosslinker can be an ethylenically-unsaturated monomer that contains, for example, two sites of ethylenic unsaturation (i.e., two ethylenically unsaturated double bonds), an ethylenically unsaturated double bond and a functional group that is reactive toward a functional group (e.g., an amide group) of the polymer chains of the polymer, or several functional groups that are reactive toward functional groups of the polymer chains of the polymer. The degree of crosslinking can be selected to control the amount of swelling of the polymer. For example, the degree of crosslinking can be used to control the amount of fluid absorption or the volume expansion of the polymer.

Exemplary crosslinkers include a diacrylamide or methacrylamide of a diamine such as a diacrylamide of piperazine; an acrylate or methacrylate ester of a di, tri, tetrahydroxy compound including ethyleneglycol diacrylate, polyethyleneglycol diacrylate, trimethylpropane trimethacrylate, ethoxylated trimethylol triacrylate, ethoxylated pentaerythritol tetracrylate, and the like; a divinyl or diallyl compound separated by an azo group such as a diallylamide of 2,2'-azobis(isobutyric acid) or a vinyl or allyl ester of a di or tri functional acid. Additional crosslinkers include water-soluble diacrylates such as poly(ethylene glycol) diacrylate (e.g., PEG 200 diacrylate) or PEG 400 diacrylate and polyfunctional vinyl derivatives of a polyalcohol such as ethoxylated (9-20) trimethylol triacrylate. Further examples of the crosslinker include aliphatic unsaturated amides, such as methylenebisacrylamide or ethylenebisacrylamide; aliphatic esters of polyols or alkoxylated polyols with ethylenically unsaturated acids, such as di(meth)acrylates or tri(meth)acrylates of butanediol, ethylene glycol, polyglycols, trimethylolpropane; di- and triacrylate esters of trimethylolpropane (which is oxyalkylated (such as ethoxylated) with an alkylene oxide such ethylene oxide); acrylate and methacrylate esters of glycerol or pentaerythritol; acrylate and methacrylate esters of glycerol and pentaerythritol oxyethylated with, e.g., ethylene oxide; allyl compounds (such as allyl(meth)acrylate, alkoxylated allyl(meth)acrylate reacted with, e.g., ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid); or monomers that are capable of crosslinking, such as N-methylol compounds of unsaturated amides, such as of methacrylamide or acrylamide, and the ethers derived therefrom. A combination of the crosslinkers also can be employed.

When the preformed synthetic polymer is in the form of a particle, the particle can includes surface crosslink external to the interior of the particle. The surface crosslinks can result from addition of a surface crosslinker to the superabsorbent polymer particle and subsequent heat treatment. The surface crosslinks can increase the crosslink density of the particle near its surface with respect to the crosslink density of the interior of the particle. Surface crosslinkers can also provide the particle with a chemical property that the superabsorbent polymer did not have before surface crosslinking, and can control the chemical properties of the particle, for example, hydrophobicity, hydrophilicity, and adhesiveness of the superabsorbent polymer to other materials, for example, minerals (e.g., silicates) or other chemicals, for example, petroleum compounds (e.g., hydrocarbons, asphaltene, and the like).

Surface crosslinkers have at least two functional groups that are reactive with a group of the polymer chains, for example, any of the above crosslinkers, or crosslinkers having reactive functional groups such as an acid (including carboxylic, sulfonic, and phosphoric acids and the corresponding anions), an amide, an alcohol, an amine, or an aldehyde. Exemplary surface crosslinkers include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and combinations comprising at least one of the foregoing.

Additional surface crosslinkers include borate, titanate, zirconate, aluminate, chromate, or a combination comprising at least one of the foregoing. Boron crosslinkers include boric acid, sodium tetraborate, encapsulated borates, and the like. Borate crosslinkers can be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Zirconium crosslinkers, e.g., zirconium lactates (e.g., sodium zirconium lactate), triethanolamines, 2,2'-iminodiethanol, or a combination comprising at least one of the foregoing can be used. Titanates crosslinkers can include, for example, lactates, triethanolamines, and the like.

The preformed synthetic polymer can include repeat units comprising an acrylate, an acrylamide, a vinylpyrrolidone, a vinyl ester (e.g., a vinyl acetate), a vinyl alcohol, a derivative thereof, or a combination comprising at least one of the foregoing. According to an embodiment, the preformed synthetic polymer can comprise polyacrylamide having crosslinks derived from polyethylene glycol diacrylate. In some embodiments, the superabsorbent polymer comprises polyacrylic acid, wherein the crosslinks are derived from a vinyl ester oligomer. In another embodiment, the superabsorbent polymer is a poly (acrylic acid) partial sodium salt-graft-poly (ethylene glycol), which is commercially available from Sigma Aldrich.

In addition to the preformed synthetic polymer, the polymer particles can further comprise a swellable natural polymer, e.g., a natural polysaccharide such as guar, carrageenan, starch, cellulose, xanthan gum, agar, pectin, alginic acid, tragacanth gum, pluran, gellan gum, tamarind seed gum, cardlan, gum arabic, glucomannan, chitin, chitosan, hyaluronic acid, and the like. The natural polysaccharides, when included in the particles, can aid in the hydration of the synthetic polymer. Alternatively, or in addition, the natural polymer can function as a friction reducer. Thus, the natural polymer can be included as a component of the cement spacer fluid, that is, added separately from the synthetic particles. The weight ratio of preformed synthetic polymer to natural polymer, e.g., guar gum or carrageen can be about 99:1 to about 80:20, for example about 97:3 to about 85:15, preferably about 95:5 to about 90:10.

In an embodiment, the natural polymer is a guar gum or carrageenan as disclosed, for example, in Japanese Patent Application No. P2003-154262A. The guar gum can be a natural guar gum or an enzyme treated guar gum obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, and the like. Carrageenan is an ionic linear polysaccharide that includes repeating galactose units that individually can be sulfated or unsulfated. Specific carrageenan types include kappa, iota, lambda, and the like. In some embodiments, a mixture of carrageenan types is used. In a specific embodiment, a carrageenan or a carrageenan-like material that forms a gel is used. In addition to natural carrageenan, suitable carrageenans include enzyme-treated substances of natural carrageenan or derivatized carrageenan, e.g., those prepared by treating natural carrageenan (e.g., with a chemical) to introduce a functional group (e.g., a carboxyl group, hydroxyl alkyl group, sulfate group, phosphate group, and the like).

The cement isolation fluid can further comprise an aqueous carrier fluid to carry the preformed synthetic polymer to the desired location in the wellbore, and to swell the polymer. The aqueous carrier fluid can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

The aqueous carrier fluid can be an aqueous mineral acid that includes hydrochloric acid, nitric acid, phosphoric acid, sulfuric acid, boric acid, hydrofluoric acid, hydrobromic acid, perchloric acid, or a combination comprising at least one of the foregoing. The fluid can be an aqueous organic acid that includes a carboxylic acid, sulfonic acid, or a combination comprising at least one of the foregoing. Exemplary carboxylic acids include formic acid, acetic acid, chloroacetic acid, dichloroacetic acid, trichloroacetic acid, trifluoroacetic acid, propionic acid, butyric acid, oxalic acid, benzoic acid, phthalic acid (including ortho-, meta- and para-isomers), and the like. Exemplary sulfonic acids include a $C_{1-20}$ alkyl sulfonic acid, wherein the alkyl group can be branched or unbranched and can be substituted or unsubstituted, or a $C_{3-20}$ aryl sulfonic acid wherein the aryl group can be monocyclic or polycyclic, and optionally comprises 1 to 3 heteroatoms (e.g., N, S, or P). Alkyl sulfonic acids can include, for example, methane sulfonic acid. Aryl sulfonic acids can include, for example, benzene sulfonic acid or toluene sulfonic acid. In some embodiments, the aryl group can be $C_{1-20}$ alkyl-substituted, i.e., is an alkylarylene group, or is attached to the sulfonic acid moiety via a $C_{1-20}$ alkylene group (i.e., an arylalkylene group), wherein the alkyl or alkylene can be substituted or unsubstituted.

The cement isolation fluid can further comprise other components known for use in cement spacers, for example a viscosifier, a viscosifier crosslinker, a pH control agent, a surfactant, a weighting agent, a lubricant, a fluid loss agent, a clay stabilizer, a biocide, an acid, a corrosion inhibitor, friction reducer, oxygen scavenger, formation fines control, foaming agent, and gel stabilizer. These additional components are selected to avoid imparting unfavorable characteristics to the cement spacers, to avoid damage to equipment in contact with the compositions, and to avoid damaging the wellbore or subterranean formation. These additional components are also selected to interfere with placement of the cement plug or curing the cement plug, for example, by hydration, gelation, or a combination comprising at least one of the foregoing, where it is placed.

The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth)acrylic acid and (meth)acrylamide, and C1-8 alkyl poly (meth)acrylates; or clays such as bentonite, sepiolite, and attapulgite, and the like; or a combination comprising at least one of the foregoing viscosifiers.

The viscosifier forms a viscous gel upon, or due to, contact with the compositions herein or fluids such as water, brine, or other downhole fluid. In some embodiments, a combination of fluids is used, for example, a first fluid to swell the preformed synthetic polymer and a second fluid to gel the cement spacer. Without being bound by theory, the presence of a viscosifier in the spacer increases the viscosity, thus the particle-suspension ability of the composition, and reduces the friction pressure. When the cement spacer is a foam, the viscosifier can further stabilize the foam. Selection of the preformed synthetic polymer and the viscosifier allow manufacture of cement spacers having beneficial rheological properties including tunable viscosity and breaking properties.

In an embodiment, a crosslinker for the viscosifier can be present, for example a borate, titanate, zirconate, aluminate, or chromate crosslinker as described above, or a combination comprising at least one of the foregoing.

The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

Weighting agents are high-specific gravity and finely divided solid materials used to increase density, for example silica flour, sand, fly ash, calcium carbonate, barite, hematite, ilemite, siderite, and the like. Preferred weighting agents are sand and silica flour.

Surfactants can increase the compatibility of the cement spacer, the cement plug, or the drilling fluid. The surfactant can be anionic, cationic, zwitterionic, or non-ionic. Other useful surfactants include those having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Exemplary cationic surfactants include $C_{1-18}$ alkyl or aryl, primary, secondary, or tertiary amines, alkanolamides, quaternary ammonium salts, alkylated imidazolium, and pyridinium salts. Additional examples of the cationic surfactant include primary to tertiary alkylamine salts such as, e.g., monostearylammonium chloride, distearylammonium chloride, tristearylammonium chloride; quaternary alkylammonium salts such as, e.g., mono stearyltrimethylammonium chloride, distearyldimethylammonium chloride, stearyldimethylbenzylammonium chloride, monostearyl-bis(polyethoxy)methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include $C_{1-60}$ carboxylates, $C_{1-20}$ alkyl sulfates, $C_{1-20}$ alkyl sulfonates, fatty acids, sulfosuccinates, $C_{1-20}$ phosphonates, or mono- or di-($C_{1-20}$ alkyl) phosphate esters. Examples of an anionic surfactant include anionic surfactants having a carboxyl group such as a sodium, potassium, or ammonium salt of a ($C_{1-20}$ alkyl) carboxylic acid, a sodium, potassium, or ammonium salt of a ($C_{7-20}$ alkylbenzene)carboxylic acid, a sodium, potassium, or ammonium salt of a poly(oxy($C_{1-4}$ alkylene) ($C_{1-12}$alkyl) ether carboxylic acid, a sodium, potassium, or ammonium salt of salt of N-acylsarcosine acid, a sodium, potassium, or ammonium salt of N-acylglutamic acid, and the like.

Nonionic surfactants can be, for example, esters and polyesters of fatty acids of up to 22 carbon atoms such as stearic acids, poly(alkylene glycols) such as poly(ethylene oxide), poly(propylene oxide), and block and random poly (ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like, ethoxylated fatty alcohols, alkyl phenol polyethoxylates, glycerol esters, glycol esters, polyethers, alkyl polyglycosides, amineoxides, or a combination comprising at least one of the foregoing. Specific examples of nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol monononyl ethers); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $(CH_3)_3N^+CH(R)COO^-$ or sulfonates (sulfo-betaines)) such as $RN^+(CH_3)_2(CH_2)_3SO_3^-$, where R is an alkyl group. Examples include n-dodecyl-N-benzyl-N-methylglycine

[$C_{12}H_{25}N^+(CH_2C_6H_5)(CH_3)CH_2COO^-$], N-allyl N-benzyl N-methyltaurines [$C_nH_{2n+1}N^+(CH_2C_6H_5)(CH_3)CH_2CH_2SO_3^-$].

In an embodiment, the surfactant is a viscoelastic surfactant capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle. Viscoelastic surfactants are usually ionic, including cationic, anionic, or zwitterionic. When the surfactant is cationic, it is associated with a negative counterion, which can be an inorganic anion such as a sulfate, a nitrate, a perchlorate or a halide such as Cl$^-$, Br$^-$, or with an aromatic organic anion such as salicylate, naphthalene sulfonate, p and m chlorobenzoates, 3,5-, 3,4-, and 2,4-dichlorobenzoates, t-butyl and ethyl phenate, 2,6- and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na$^+$ or K$^+$. When it is zwitternionic, it is associated with both negative and positive counterions, for example, Cl$^-$ and Na$^+$ or K$^+$. Viscoelastic surfactant has been described in U.S. Pat. Nos. 7,081,439 and 7,279,446.

The cement isolation fluid can be a gel, a liquid, or a foam. The carrier fluid can be foamed with a liquid hydrocarbon or a gas or liquefied gas such as nitrogen or carbon dioxide. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in fracturing low pressure or water sensitive formations.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine, cellulose derivatives, and polystyrene sulfonate. In some embodiments, the same polymer functions as both a viscosifier and a fluid-loss control agent.

The clay stabilizer prevents the clay downhole from swelling under contact with the cement spacer or applied fracturing pressure and can be, for example, a quaternary amine, a brine (e.g., KCl brine), choline chloride, tetramethyl ammonium chloride, and the like.

A biocide prevents injection of a microbe (e.g., bacteria) downhole by eliminating or reducing bacteria in the cement spacer, thus reducing production of, e.g., sour gas. Examples of biocides include aldehydes such as glutaraldehyde, oxidizing biocides such as hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like, stabilized sodium hypobromite, activated sodium bromide, brominated hydantoins, chlorine dioxide, ozone, inorganic persulfates such as ammonium persulfate, or peroxides, such as hydrogen peroxide, and organic peroxides, and non-oxidizing biocides such as dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, quaternary ammonium salts (e.g., having a fatty alkyl group and three methyl groups), and quaternary phosphonium salts having methyl groups, hydroxymethyl groups or aryl groups. Specific examples of biocides include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination comprising at least one of the foregoing can be used. In an embodiment, the biocide is encapsulated or coated.

The various properties of the cement spacers can be varied and can be adjusted according to well control and compatibility parameters associated with the particular drilling fluid and cement slurry with which it is associated. In an embodiment, the cement spacer fluid includes the preformed synthetic polymer in an amount of about 1 pound to about 150 pounds per thousand gallons of aqueous cement spacer carrier fluid, preferably about 10 pounds to about 100 pounds per thousand gallons per thousand gallons of aqueous cement spacer carrier fluid, more preferably about 30 pounds to about 60 pounds per thousand gallons per thousand gallons of aqueous cement spacer carrier fluid.

The cement isolation fluid can be premixed or is injected without mixing, e.g., injected "on the fly" where the components are combined as the cement spacer is being injected downhole. The order of addition can be varied and the time of injecting each is the same or different.

In a method of cementing a wellbore comprising a drilling fluid, the method includes injecting, generally pumping, the cement isolation fluid into the wellbore; injecting a cement slurry into the wellbore (optionally with a "lead slurry" or a "tail slurry"); and hardening the cement in the slurry to cement the wellbore. The cement spacer is used to hold the cement plug where it is placed and to prevent density swapping of heavier cement slurry with lighter drilling fluid after slurry placement. Usually the cement isolation fluid is injected before the slurry, but it is possible to also use it to isolate the cement slurry from following drilling fluids, alone or with a first isolation fluid. Thus, in another embodiment the method includes injecting a first cement spacer into the wellbore. A cement slurry is then injected into the wellbore, followed by injecting a second isolation cement fluid. As the first and second isolation fluid contact the cement slurry, on either side, the slurry is sandwiched by the first and the second cement spacer. The first and second cement isolation fluid can be different or the same.

The cement slurry is subsequently allowed to harden, set up, settle, cure, and the like, preferably by hydration or gelation processes, to form the cement plug in the wellbore annulus, which prevents the flow of reservoir fluids between two or more permeable geologic formations that exist with unequal reservoir pressures.

The drilling fluid can be a drilling mud, water, brine water, a cement spacer used to remove the drilling mud, or any other fluid suitable for use in a wellbore. The cement can be any cementitious material that sets and hardens by reaction with water, and is suitable for forming a set cement downhole, including mortars and concretes. Suitable hydraulic cements, including mortars and concretes, include those typically employed in a wellbore environment, for example those comprising calcium, aluminum, silicon, oxygen, or sulfur. Such hydraulic cements include, but are not limited to, Portland cements, pozzolana cements, gypsum cements, high alumina content cements, silica cements, and high alkalinity cements. Portland cements are particularly useful. In some embodiments, the Portland cements that are suited for use are classified as Class A, B, C, G, and H cements according to American Petroleum Institute, API Specification for Materials and Testing for Well Cements. The cements as used herein encompass various concretes by the further addition of aggregates, such as a coarse aggregate made of gravel or crushed rocks such as chert, quartzite, granite, or a fine aggregate such as sand or crushed sand. The cement slurries can further comprise other components known for use in cementing, for example an accelerator to reduce setting time, a setting retardant to extend setting time, a fluid loss control agent, an extender to lower density, a foaming agent to reduce density, a weighting agent to increase density, a dispersant to reduce viscosity, other fluid loss control agents, thixotropic agents, a bridging agent (e.g., gilsonite or cellophane flakes), or a combination comprising at least one of the foregoing. Portland cement is preferred.

The cement slurry can be used to form downhole components, including various casings, seals, plugs, packings, liners, and the like. In an embodiment the component is a plug, including a temporary cement plug, permanent cement plug, or a whipstock cement plug. The whipstock plug can be used to kick off from a vertical wellbore when a directional change in drilling is desired.

As is known by those of skill in the art, a high degree of variability exists in the above description of well cementation (e.g., multiple bottom plugs, graduated fluid densities, etc.), and can be effected using cement isolation fluid described herein. The wellbore can be vertical, deviated and horizontal, preferably a vertical wellbore.

Use of the cement isolation fluids provides a number of benefits. The compositions are stable at high wellbore temperatures. In one benefit, the isolation fluids suppress or minimize mixing and remixing of drilling fluid and cement slurries, fluid density swapping, and drilling mud contamination to the leading edge of the cement slurry. Another benefit is enhanced segregation performance with respect to separating wellbore fluids, resulting in streamlined and easier placement of the cement plug at its intended place in the wellbore. Additionally, the compositions herein reduce cement set-up times and prevent or minimize the risk of cement plug set-up failures. Thus, the compositions beneficially improve the overall quality of plug cementing operations in the drill hole.

The methods and compositions herein further have the advantages of improved plug cementing, by efficiently separating the cement slurry from drilling mud (or other drilling fluid) in the presence of a cement spacer. It will be appreciated that it is not necessary for the drilling fluids and the cement slurry to be completely segregated for the method and compositions herein to be considered successful. Success is obtained if a cement slurry sets up more readily, reliably, and less disturbance where it is placed using the cement isolation fluids than if it is not used. In general, of course, it is desirable to set a cement slurry with the least disturbance possible where it is placed.

All ranges disclosed herein are inclusive of the endpoints, and the endpoints are independently combinable with each other. The ranges are continuous and thus contain every value and subset comprising at least one of the foregoing in the range. As used herein, "combination" is inclusive of blends, mixtures, alloys, reaction products, and the like. The term "(meth)acryl" is inclusive of both acryl and methacryl. As used herein, "a combination comprising at least one of the foregoing" refers to a combination comprising at least one of the named constituents, components, compounds, or elements, optionally with a like component, compound, or element not named. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or". It should further be noted that the terms "first," "second," "primary," "secondary," and the like herein do not denote any order, quantity, or importance, but rather are used to distinguish one element from another. Embodiments herein can be used independently or can be combined.

All references are incorporated herein by reference.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A cement isolation fluid for use in a wellbore comprising:
    an aqueous carrier fluid; and
    a preformed synthetic polymer swellable in the carrier fluid in an amount effective to isolate a cement slurry from another drilling fluid present in the wellbore during a cementing operation,
    the preformed synthetic polymer comprising a copolymer of (meth)acrylamide with one or more of the following, maleic anhydride, vinyl acetate, ethylene oxide, ethylene glycol, or acrylonitrile;
    poly(acrylamide) having crosslinks derived from polyethylene glycol diacrylate;
    poly(acrylic acid) having crosslinks derived from a vinyl ester oligomer;
    a poly(acrylic acid) partial sodium salt-graft-poly(ethylene glycol); or
    a copolymer of acrylic acid and a salt thereof having crosslinks derived from polyethylene glycol diacrylate; and the preformed synthetic polymer being present in the cement isolation fluid in a concentration of about 1 pound to about 150 pounds per thousand gallons of aqueous cement isolation carrier fluid.

2. The cement isolation fluid of claim 1, wherein the carrier fluid comprises fresh water, salt water, aqueous acid, aqueous base, or a combination comprising at least one of the foregoing.

3. The cement isolation fluid of claim 1, wherein the preformed synthetic polymer is stable up to about 350° F.

4. The cement isolation fluid of claim 1, wherein the preformed synthetic polymer comprises
a poly(acrylic acid) partial sodium salt-graft-poly(ethylene glycol).

5. The cement isolation fluid of claim 1, wherein the preformed synthetic polymer is present in the form of particles, comprising the polymer.

6. The cement isolation fluid of claim 1, wherein the particles are swelled and at least about 50% of the polymer particles have an average largest diameter of about 500 to about 12,000 micrometers.

7. The cement isolation fluid of claim 1, wherein the preformed synthetic polymer is present in the cement isolation fluid in a concentration of about 10 pounds to about 100 pounds per thousand gallons of aqueous cement isolation carrier fluid.

8. The cement isolation fluid of claim 1, further comprising guar, carrageenan, or a combination comprising at least one of the foregoing.

9. The cement isolation fluid of claim 1, wherein the preformed synthetic polymer is present in the form of a hydrated pack of swelled polymer particles.

10. A method of cementing a wellbore comprising a drilling fluid, the method comprising
injecting the cement isolation fluid into the wellbore;
injecting a cement slurry into the wellbore; and
hardening the cement in the slurry to cement the wellbore,
the cement isolation fluid for use in a wellbore comprising:
an aqueous carrier fluid; and
a preformed synthetic polymer swellable in the carrier fluid in an amount effective to isolate a cement slurry from another drilling fluid present in the wellbore during a cementing operation,
the preformed synthetic polymer comprising a homopolymer of (meth)acrylamide or a copolymer of (meth)acrylamide with one or more of the following: maleic anhydride, vinyl acetate, ethylene oxide, ethylene glycol, or acrylonitrile;
poly(acrylamide) having crosslinks derived from polyethylene glycol diacrylate;
poly(acrylic acid) having crosslinks derived from a vinyl ester oligomer,
a poly(acrylic acid) partial sodium salt-graft-poly(ethylene glycol); or
a copolymer of acrylic acid and a salt thereof having crosslinks derived from polyethylene glycol diacrylate; and
the preformed synthetic polymer being present in the cement isolation fluid in a concentration of about 1 pound to about 150 pounds per thousand gallons of aqueous cement isolation carrier fluid.

11. The method of claim 10, wherein injecting the cement slurry is subsequent to injecting the isolation fluid.

12. The method of claim 11, further comprising injecting a second cement isolation fluid after injecting the cement slurry.

13. The method of claim 10, further comprising injecting a cement spacer fluid to displace the drilling fluid; subsequently injecting the cement isolation fluid; and subsequently injecting the cement slurry.

14. The method of claim 10, wherein the cement isolation fluid prevents density swapping between the cement slurry and a drilling fluid, or between the cement slurry and a wellbore fluid.

15. The method of claim 10, wherein the wellbore is a vertical wellbore.

16. The method of claim 10, wherein the synthetic polymer comprises poly(acrylamide) having crosslinks derived from polyethylene glycol diacrylate.

17. The method of claim 10, wherein the synthetic polymer comprises poly(acrylic acid) having crosslinks derived from a vinyl ester oligomer.

18. The method of claim 10, wherein the synthetic polymer comprises a poly(acrylic acid) partial sodium salt-graft-poly(ethylene glycol).

19. The method of claim 10, wherein the synthetic polymer comprises a copolymer of acrylic acid and a salt thereof having crosslinks derived from polyethylene glycol diacrylate.

20. The method of claim 10, wherein the preformed synthetic polymer is present in the cement isolation fluid in a concentration of about 10 pounds to about 100 pounds per thousand gallons of aqueous cement isolation carrier fluid.

21. The method of claim 10, wherein the preformed synthetic polymer is present in the cement isolation fluid in a concentration of about 30 pounds to about 60 pounds per thousand gallons of aqueous cement isolation carrier fluid.

22. The method of claim 10, wherein injecting the isolation fluid is after injecting the cement slurry.

* * * * *